(12) United States Patent
Erickson et al.

(10) Patent No.: US 8,813,038 B2
(45) Date of Patent: Aug. 19, 2014

(54) DATA RACE DETECTION

(75) Inventors: John Erickson, Redmond, WA (US);
Madan Musuvathi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 13/023,547

(22) Filed: Feb. 9, 2011

(65) Prior Publication Data
US 2012/0204062 A1 Aug. 9, 2012

(51) Int. Cl.
*G06F 9/44* (2006.01)
*G06F 9/45* (2006.01)

(52) U.S. Cl.
USPC ........... 717/126; 717/124; 717/131; 717/141; 717/152

(58) Field of Classification Search
CPC . G06F 8/443; G06F 9/44589; G06F 11/3466; G06F 11/3688
See application file for complete search history.

(56) References Cited

U.S. PATENT DOCUMENTS

| | | | |
|---|---|---|---|
| 6,526,567 B1 * | 2/2003 | Cobbett et al. | 717/124 |
| 7,076,776 B2 | 7/2006 | Kim et al. | |
| 7,469,403 B2 | 12/2008 | Choi et al. | |
| 7,549,150 B2 | 6/2009 | Yu | |
| 7,673,181 B1 * | 3/2010 | Lindo et al. | 714/38.13 |
| 7,877,549 B1 * | 1/2011 | Panwar et al. | 711/141 |
| 8,185,875 B2 * | 5/2012 | Kahlon et al. | 717/126 |
| 8,464,223 B2 * | 6/2013 | Choi et al. | 717/126 |
| 8,527,976 B2 * | 9/2013 | Kahlon et al. | 717/152 |
| 8,533,681 B2 * | 9/2013 | Zhou et al. | 717/126 |
| 8,539,450 B2 * | 9/2013 | Kahlon et al. | 717/126 |
| 2003/0131283 A1 * | 7/2003 | Ur et al. | 714/36 |
| 2003/0236951 A1 * | 12/2003 | Choi et al. | 711/150 |
| 2007/0245312 A1 * | 10/2007 | Qadeer et al. | 717/124 |
| 2009/0199162 A1 | 8/2009 | Choi et al. | |
| 2010/0070955 A1 * | 3/2010 | Kahlon | 717/141 |
| 2010/0131931 A1 | 5/2010 | Musuvathi et al. | |
| 2011/0131550 A1 * | 6/2011 | Burckhardt et al. | 717/124 |
| 2012/0204154 A1 * | 8/2012 | Li et al. | 717/124 |
| 2012/0278792 A1 * | 11/2012 | Kuperstein et al. | 717/131 |

OTHER PUBLICATIONS

Betts et al., GPUVerify: a verifier for GPU kernels, Nov. 2012, 19 pages.*
Voung et al., RELAY: static race detection on millions of lines of code, Sep. 2007, 10 pages.*
Zheng et al., GRace: a low-overhead mechanism for detecting data races in GPU programs, Feb. 2011, 11 pages.*
Serebryany, et al. "ThreadSanitizer—data race detection in practice", Retrieved at << http://static.googleusercontent.com/external_content/untrusted_dlcp/research.google.com/en//pubs/archive/35604.pdf >>, WBIA, Dec. 12, 2009, p. 62-71.

(Continued)

*Primary Examiner* — Thuy Dao
(74) *Attorney, Agent, or Firm* — Dan Choi; Brian Haslam; Micky Minhas

(57) ABSTRACT

The claimed subject matter provides a method for detecting a data race. The method includes inserting a plurality of breakpoints into a corresponding plurality of program locations. Each of the program locations accesses a plurality of memory locations. Each of the program locations is selected randomly. The method also includes detecting one or more data races for the memory locations in response to one or more of the breakpoints firing. Additionally, the method includes generating a report describing the one or more data races.

19 Claims, 8 Drawing Sheets

(56) References Cited

OTHER PUBLICATIONS

Letko, et al., "AtomRace: Data Race and Atomicity Violation Detector and Healer", Retrieved at << http://www.fit.vutbr.cz/~vojnar/Publications/lvk-padtad-08.pdf >>, International Symposium on Software Testing and Analysis, Jul. 20-24, 2008, pp. 11.

Savage, et al., "Eraser: A Dynamic Data Race Detector for Multi threaded Programs", Retrieved at << http://www.cs.washington.edu/homes/tom/pubs/eraser.pdf >>, ACM Transactions on Computer Systems, vol. 15, No. 4, Nov. 1997, p. 391-411.

Callahan, "Hybrid Dynamic Data Race Detection", Retrieved at << http://www.cse.msu.edu/~cse914/Readings/hybrid-DynamicRaceDetection-ppopp03.pdf >>, ACM SIGPLAN Symposium on Principles and Practice of Parallel Programming, Jun. 11-13, 2003, p. 167-178.

Yu, et al., "RaceTrack: Efficient Detection of Data Race Conditions via Adaptive Tracking", Retrieved at << http://citeseerx.ist.psu.edu/viewdoc/download?doi=10.1.1.115.5528&rep=rep1&type=pdf >>, SOSP, Oct. 23-26, 2005, p. 221-234.

Bond, et al. "PACER: Proportional Detection of Data Races", Retrieved at << http://www.cs.utexas.edu/~mikebond/pacer-pldi-2010.pdf >>, ACM SIGPLAN Conference on Programming Language Design and Implementation, Jun. 5-10, 2010, pp. 14.

Marino, et al., "LiteRace: Effective Sampling for Lightweight Data-Race Detection", Retrieved at << http://www1.cs.columbia.edu/~junfeng/09fa-e6998/papers/literace.pdf >>, ACM SIGPLAN Conference on Programming Language Design and Implementation, Jun. 15-21, 2009, pp. 10.

Flanagan, et al., "FastTrack: Efficient and Precise Dynamic Race Detection", Retrieved at << http://slang.soe.ucsc.edu/cormac/papers/pldi09.pdf >>, ACM SIGPLAN Conference on Programming Language Design and Implementation, Jun. 15-20, 2009, pp. 13.

Pozniansky, et al., "MultiRace: Efficient on-the-Fly Data Race Detection in Multithreaded C++ Programs", Retrieved at << http://www.cs.technion.ac.il/~assaf/publications/MultiRace.pdf >>, Concurrency and Computation: Practice & Experience—Parallel and Distributed Systems: Testing and Debugging, vol. 19 No. 3, Mar. 2007, pp. 49.

Lamport, "Time, Clocks, and the Ordering of Events in a Distributed System", Retrieved at << http://www.ics.uci.edu/~cs237/reading/time.pdf >>, Communications of the ACM, vol. 21 No. 7, Jul. 1978, p. 1-5.

Sack, et al., "Accurate and Efficient Filtering for the Intel Thread Checker Race Detector", Retrieved at << http://citeseerx.ist.psu.edu/viewdoc/download?doi=10.1.1.86.6369&rep=rep1&type=pdf >>, Architectural Support for Programming Languages and Operating Systems, Oct. 21-25, 20006, p. 1-8.

Boehm, et al., "Foundations of the C++ Concurrency Memory Model", Retrieved at << http://diy.inria.fr/bib/ba08.pdf >>, ACM SIGPLAN Conference on Programming Language Design and Implementation, Jun. 7-13, 2008, p. 12.

Boehm, Hans-J., "N1411: Memory Model Rationale", Retrieved at << http://www.open-std.org/JTC1/SC22/WG14/www/docs/n1411.htm >>, Sep. 30, 2009, pp. 7.

Engler, et al., "RacerX: Effective, Static Detection of Race Conditions and Deadlocks", Retrieved at << http://citeseerx.ist.psu.edu/viewdoc/download;jsessionid=295826D6C2DF375A781B83C43AA2484F?doi=10.1.1.137.1635&rep=rep1&type=pdf >>, ACM Symposium on Operating Systems Principles, Oct. 19-22, 2003, p. 237-252.

Naik, et al., "Effective Static Race Detection for Java", Retrieved at << http://citeseerx.ist.psu.edu/viewdoc/download?doi=10.1.1.81.585&rep=rep1&type=pdf >>, ACM SIGPLAN Conference on Programming Language Design and Implementation, Jun. 11-14, 2006, pp. 12.

Anderson, et al., "Lightweight Annotations for Controlling Sharing in Concurrent Data Structures", Retrieved at << http://citeseerx.ist.psu.edu/viewdoc/download?doi=10.1.1.154.8331&rep=rep1&type=pdf >>, ACM SIGPLAN Conference on Programming Language Design and Implementation, Jun. 15-21, 2009, pp. 12.

Boyapati, et al., "Ownership Types for Safe Programming: Preventing Data Races and Deadlocks", Retrieved at << http://citeseerx.ist.psu.edu/viewdoc/download?doi=10.1.1.5802&rep=rep1&type=pdf >>, ACM Conference on Object-Oriented Programming) SystF-rns) LanguagF-s and Applications (OOPSLA)), Nov. 4-8, 2002, p. 211-230.

"The IDA Pro Disassembler and Debugger", Retrieved at << http://www.hex-rays.com/idapro/ >>, Retrieved Date : Oct. 18, 2010, p. 1.

Sen, Koushik, "Race Directed Random Testing of Concurrent Programs", Retrieved at << http://citeseerx.ist.psu.edu/viewdoc/download?doi=10.1.1.140.9611&rep=rep1&type=pdf >>, ACM SIGPLAN Conference on Programming Language Design and Implementation, Jun. 7-13, 2008, pp. 11.

Narayanasamy, et al, "Automatically Classifying Benign and Harmful Data Races Using Replay Analysis", Retrieved at << http://citeseerx.ist.psu.edu/viewdoc/download;jsessionid=FB19E53A5E36337906A1A41E8F4959D2?doi=10.1.1.75.6518&rep=rep1&type=pdf >>, ACM SIGPLAN Conference on Programming Language Design and Implementation, Jun. 11-13, 2007, pp. 11.

Woo, et al., "The SPLASH-2 Programs: Characterization and Methodological Considerations", Retrieved at << http://citeseerx.ist.psu.edu/viewdoc/download?doi=10.1.1.104.6469&rep=rep1&type=pdf>>, To appear in the Proceedings of the 22nd Annual International Symposium on Computer Architecture, Jun. 1995, p. 1-13.

Srivastava, et al., "ATOM: A System for Building Customized Program Analysis Tools", Retrieved at << http://citeseerx.ist.psu.edu/viewdoc/download?doi=10.1.1.119.8540&rep=rep1&type=pdf >>, This paper will appear at the SIGPLAN Conference on Programming Language Design and Implementation, Mar. 1994, pp. 27.

Banerjee, et al., "Unraveling Data Race Detection in the Intel® Thread Checker", Retrieved at << http://citeseerx.ist.psu.edu/viewdoc/download?doi=10.1.1.112.8656&rep=rep1&type=pdf >>, Proceedings of STMCS, Jul. 29, 2006, pp. 10. (date corrected).

* cited by examiner

500

600

DATA RACE DETECTION

BACKGROUND

One of the challenges of concurrent systems involves finding and fixing concurrency errors. Data races are an important class of concurrency errors, where a software application fails to use proper synchronization when accessing data shared with another application or with other parts of the same application. A program contains a data race if two conflicting accesses to a memory location can occur concurrently. Two memory accesses in a program are said to conflict if they access the same memory location and at least one of them is a write.

For example, two different threads of a program may reference bit fields that map to the same memory location. Concurrent access by both threads to the memory location may cause a data race. As a result of the data race, an update by one thread may hide an update made by the other.

The possible effects of data race conditions include immediate program crashes, silent lost updates, and data corruptions. All of these effects are challenging to reproduce and debug.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a method and a system for detecting data race conditions. Program instructions that access memory locations may be used as a sampling set for placing a small number of breakpoints. When the breakpoints fire, the executing thread may be paused to detect a data race using two simultaneous strategies: trapping and repeated reads. The trapping may trap on memory accesses by another thread during the pause. The repeated read includes reading the memory location before and after the pause to determine if another thread modified the memory location. Data race detection may be performed for code executed in kernel or user mode.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
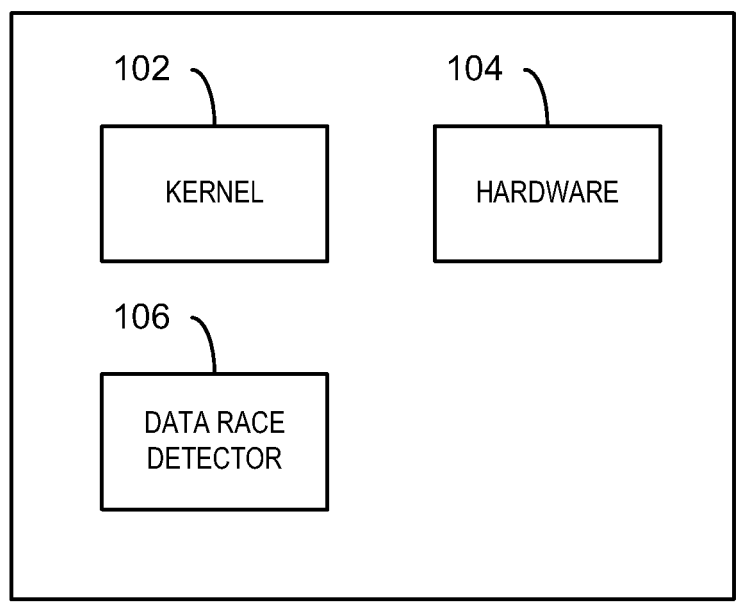
FIG. 1 is a block diagram of a system for detecting a data race in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

1. Introduction

Data races are an important class of concurrency errors where two threads erroneously access a shared memory location without appropriate synchronization. An exemplary embodiment of the subject innovation may provide a lightweight, effective technique for dynamically detecting data races in both kernel and user modules. Unlike existing data-race detection techniques, an exemplary method is oblivious to synchronization protocols (such as locking disciplines) that a software application, i.e., program, uses to protect shared memory accesses. This may be advantageous for low-level kernel code that uses a myriad of complex synchronization mechanisms. Such synchronization mechanisms may be specific to architectures and devices.

To reduce the runtime overhead, an exemplary method may randomly sample a small percentage of memory accesses as candidates for data-race detection. Breakpoint facilities already supported by many hardware architectures may be used to achieve negligible runtime overheads. An exemplary embodiment detected twenty-five confirmed erroneous data races, which were readily corrected to improve performance of the operating system.

One such data race resulted from a variation of the following code segments. A memory location, defined:

```
struct {
    int status:4;
    int pktRcvd:28;
} st;
CODE SEGMENT 1
``` was accessed by the following code segment in thread A:

```
st.status = 1;
CODE SEGMENT 2
``` and the following code segment in thread B:

```
st.pktRcvd ++;
CODE SEGMENT 3
```

The threads appear to be accessing different fields. However, the variables are actually bit fields, mapped to the same memory location by the compiler. As such, concurrent accesses by thread A and thread B may result in a data race. In this case, an update to the statistics field possibly hides an update to the status field.

Researchers have proposed numerous dynamic data-race detectors for user-mode programs. Typically detectors work by dynamically monitoring the memory accesses and synchronizations performed during a concurrent execution. As data races manifest rarely at runtime, these tools merely attempt to infer conflicting accesses that possibly executed concurrently.

The tools differ in how the inference is performed. Some implementations use a happens-before ordering, induced by the synchronization operations. Other implementations use a lock-set based reasoning, or some combination.

There are several challenges in engineering a data-race detection tool for the kernel using previous approaches. First, the kernel-mode code operates at a lower concurrency abstraction than user-mode code. As such, user-mode code may rely on clean abstractions of threads and synchronizations provided by the kernel.

However, in the kernel, the same thread context can execute code from a user-mode process, a device interrupt service routine, or a deferred procedure call (DPC). Additionally, inferring the happens-before relation or lock-sets is typically based on understanding the semantics of complex synchronization primitives. For example, one typical operating system supports more than a dozen locks with different semantics on how the lock holder synchronizes with hardware interrupts, the scheduler, and the DPCs. It is also common for kernel modules to roll-out custom implementations of synchronization primitives.

Second, hardware-facing kernel modules typically synchronize with hardware devices that concurrently modify device state and memory. An exemplary embodiment of the subject innovation may find these otherwise hard-to-find data races between the hardware and the kernel.

Third, existing dynamic data-race detectors add prohibitive run-time overheads. It is not uncommon for such tools to incur up to 200× slowdowns. The overhead is primarily due to monitoring and processing all memory and synchronization operations at run time.

Fourth, existing dynamic data-race detectors require an exhaustive knowledge of synchronization primitives to work properly. Should the implementation of one of these previous detectors omit a synchronization method, it would result in the detector infer data races that could not actually happen.

Fifth, existing dynamic data-race detectors require an analysis phase that lags the actual runtime of the system. Thus, when a data race is detected, the system is no longer in the relevant state in which the data race occurred. As our data-race detector is able detect data-races as they occur, the user is given the option to pause the entire system right as the data-race occurs. Knowing the context that causes the data-race is of great help in the debugging process.

Significant engineering effort in building data-race detectors goes in reducing the runtime overhead and the associated memory and log management. Replicating these efforts within the constraints of kernel programming is challenging. Moreover, typical tools rely on invasive instrumentation techniques that are difficult to get right on low-level kernel code.

FIG. 1 is a block diagram of a system 100 for detecting a data race in accordance with the claimed subject matter. The system 100 may be a standard computing system including a kernel 102 and hardware 104.

In an exemplary embodiment of the invention, the kernel 102 may be a 32-bit operating system running on an x86 architecture. The implementation may use the code and data breakpoint mechanisms readily available on the x86 architecture. However, the techniques described herein may be extended to other architectures and to user-mode code.

The hardware 104 may include a microprocessor and any other number of devices connected, attached, networked, or otherwise coupled to the system 100. The hardware 104 may also include appropriate software and drivers, such as file systems, networking stacks, storage drivers, network file systems, etc.

The system 100 may also include a data race detector 106. The data race detector 106 is also referred to as the detector 106 herein. The detector 106 may be a lightweight tool for dynamically detecting data races in kernel modules. The detector 106 may sample a small number of memory accesses and use code-breakpoint and data-breakpoint 1 facilities to detect data races. Advantageously, the various breakpoint facilities available in modern hardware architectures may be used. As a result, the detector 106 may have no runtime overhead for non-sampled memory accesses. Avoiding runtime overhead in this way enables the detector 106 to run with negligible overheads when using low sampling rates.

Figure 2:
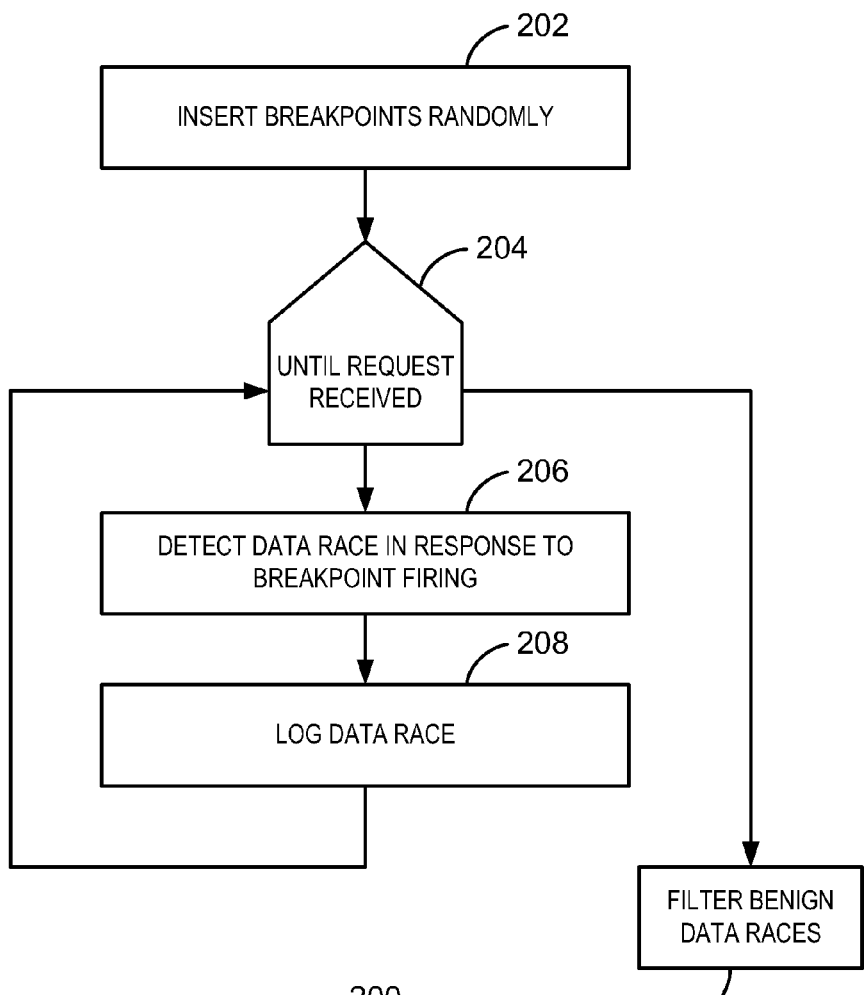
FIG. 2 is a process flow diagram of a method for detecting a data race in accordance with the claimed subject matter.

FIG. 2 is a process flow diagram of a method 200 for detecting a data race in accordance with the claimed subject matter. The method 200 may be performed by the detector 106.

The method 200 may begin at block 202, where the data race detector inserts breakpoints randomly into code that accesses memory. The detector 106 may sample a small number of memory accesses at runtime by inserting code breakpoints at randomly chosen memory access instructions. The insertion of breakpoints, also referred to herein as sampling, is described in greater detail with respect to FIG. 3.

The detection of data races may be logged in a report, created in response to a user request. As such, the blocks 204-208 may be repeated until a user requests the report.

At block 206, the detector 106 may detect data races in response to the inserted breakpoints firing. The data race detection may take place within a small time window. In an exemplary embodiment of the invention, the detector 106 simultaneously employs two strategies. One strategy involves setting a data breakpoint to trap conflicting accesses by other threads. The other strategy involves a repeated-read.

When the detector 106 finds a data race through the data-breakpoint strategy, it catches both threads "red-handed," as they are about to execute conflicting accesses. Advantageously, this may simplify debugging because the data race detector may capture and report useful debugging information. The detection of data races is described in greater detail with respect to FIG. 4.

At block 208, the data race may be logged for reporting. An exemplary log may include debugging information such as the stack trace of the racing threads, and corresponding context information.

Some data races are benign, and not erroneous. Such benign races include races that do not affect the program outcome, such as updates to logging or debugging variables. Other benign races include races that affect the program outcome in a manner acceptable to the programmer, such as conflicting updates to a low-fidelity counter.

At block 210, the detector 106 may filter benign data races from the data race log. A post-processing phase may be used that prunes and prioritizes the data-race reports before showing them to the user. In an exemplary implementation, approximately 10% of data-race reports corresponded to real errors. Advantageously, filtering the data race reports for benign races simplifies reporting and debugging. Methods to implement each of blocks 202, 206, and 210 are described in greater detail with respect to FIG. 3.

The following code segment represents an exemplary implementation of the method 200:

```
AtPeriodicIntervals( ) {
    // determine k based on desired
    // memory access sampling rate
    repeat k times {
        pc = RandomlyChosenMemoryAccess( );
        SetCodeBreakpoint( pc );
    }
}
OnCodeBreakpoint( pc ) {
    // disassemble the instruction at pc
    (loc, size, isWrite) = disasm( pc );
    DetectConflicts(loc, size, isWrite);
    // set another code break point
    pc = RandomlyChosenMemoryAccess( );
    SetCodeBreakpoint( pc );
}
```

-continued

```
DetectConflicts( loc, size, isWrite) {
    temp = read( loc, size );
    if ( isWrite)
        SetDataBreakpointRW( loc, size );
    else
        SetDataBreakpointW( loc, size );
    delay( );
    ClearDataBreakpoint( loc, size );
    temp' = read( loc, size );
    if( temp != temp' ||
        data breakpoint fired )
        ReportDataRace( );
}
CODE SEGMENT 4
```

Using the CODE SEGMENT 4, the detector 106 may monitor for any concurrent accesses that conflict with the current access, right before a read or write access to shared memory location. As stated previously, the monitored access may be chosen at random.

2. Motivation

Shared memory multiprocessors are specifically built to allow concurrent access to shared data. However, programmers using synchronization to restrict accesses to shared memory may inadvertently create data races. Data races can thus be an indication of incorrect or insufficient synchronization in the program. In addition, data races may result from programming mistakes not directly related to concurrency, such as buffer overruns or use-after-free, which indirectly result in inadvertent sharing of memory.

Another reason for avoiding data races is to protect the program from the weak memory models of the compiler and the hardware 104. Both the compiler and hardware 104 can reorder instructions and change the behavior of racy programs in complex and confusing ways. Even if a racy program works correctly for the current compiler and hardware 104, the racy program might fail on future configurations that implement more aggressive memory-model relaxations.

While bugs caused by data races may be found using stress testing, this typical approach may fail to provide actionable information for a user trying to debug the data race. A data race report may include helpful stack traces, data values, or even a core dump demonstrating the actual data race. Such a data race report may be easier to understand and fix than a silent data corruption that leads to an obscure failure at some later point during program execution.

2.1. Definition of Data Race

The definition of data race may vary depending on the context. For clarity, a definition for data race, as referred to herein is provided. A program has a data race if it can be executed on a multiprocessor in such a way that two conflicting memory accesses are performed simultaneously (by processors or any other device). Two operations that access main memory are called conflicting if: 1) the physical memory they access is not disjoint, 2) at least one of them is a write, and 3) they are not both synchronization accesses.

This definition is based on standards relating to Posix threads, drafts of the C++ and C memory model standards. The definition is generalized to account for the particularities of kernel code. This definition is a simplification of the C++ and C memory model standards in that the ambiguous notion of "not ordered before" is replaced with the unambiguous "performed simultaneously," which refers to real time.

This definition also distinguishes between synchronization and data accesses. Some memory accesses participate in perfectly desirable races. For example, a mutex implementation may perform a "release" by storing the value 0 in a shared location. At the same time, another thread may be performing an acquire and read the same memory location. However, this is not a data race because both of these accesses are synchronization accesses. Synchronization accesses either involve hardware synchronization primitives, such as interlocked instructions, or, use volatile or atomic annotations supported by the compiler.

It should be noted that the definition is general enough to apply to code running in the kernel 102, which poses some unique problems not found in user-mode code. For example, in some cases, data races may be avoided by turning off interrupts. Also, processes can exhibit a data race when accessing different virtual addresses that map to the same physical address. These are described in greater detail with respect to Section 2.3.4.

2.2. Precision of Detection

It may be desirable to report as many data races as possible without inundating the user with false error reports. The following terminology is used herein to discuss the precision and completeness of the detector 106. A missed race is a data race that the detector 106 does not detect. A benign data race is a data race that does not adversely affect the behavior of the program. Common examples of benign data races include threads racing on updates to logging or statistics variables and threads concurrently updating a shared counter where the occasional incorrect update of the counter does not affect the outcome of the program.

On the other hand, a false data race is an error report that does not correspond to an actual data race. Static data-race detection techniques commonly produce false data races due to their inherent inability to precisely reason about program paths, aliased heap objects, and function pointers. Dynamic data-race detectors may also report false data races if they do not identify or understand the semantics of all the synchronizations used by the program.

3. Sampling, Detection, and Benign Races

3.1 Sampling

Herein, the term sampling is used to describe inserting breakpoints into a random sampling of memory accesses in the kernel 102. There are several challenges in designing a good sampling algorithm for data-race detection.

First, data races involve two memory accesses, both of which need to be sampled to detect the race. If memory accesses are sampled independently, then the probability of finding the data race is a product of the individual sampling probabilities.

The detector 106 may avoid this multiplicative effect by sampling a first memory access only, and using a data breakpoint to trap a second access. This may enable the detector 106 to be effective using low sampling rates.

The second challenge is due to data races being rare events. Most executed instructions do not result in a data race. An exemplary embodiment may weed out a small percentage of racing accesses from the majority of non-racing accesses.

It should be noted that if a program location is buggy, and fails to synchronize correctly, every dynamic execution of that buggy code is likely to participate in a data race. Accordingly, the detector 106 may perform static sampling of program locations rather than dynamic sampling of executed instructions. A static sampler provides equal preference to breakpointing on rarely executed instructions and frequently executed instructions. Instructions that are rarely executed are likely untested, meaning a greater likelihood of data races. As a result, the detector 106 may advantageously increase the likelihood of detecting data races.

3.1.1. Static Sampling Using Code Breakpoints

Figure 3:
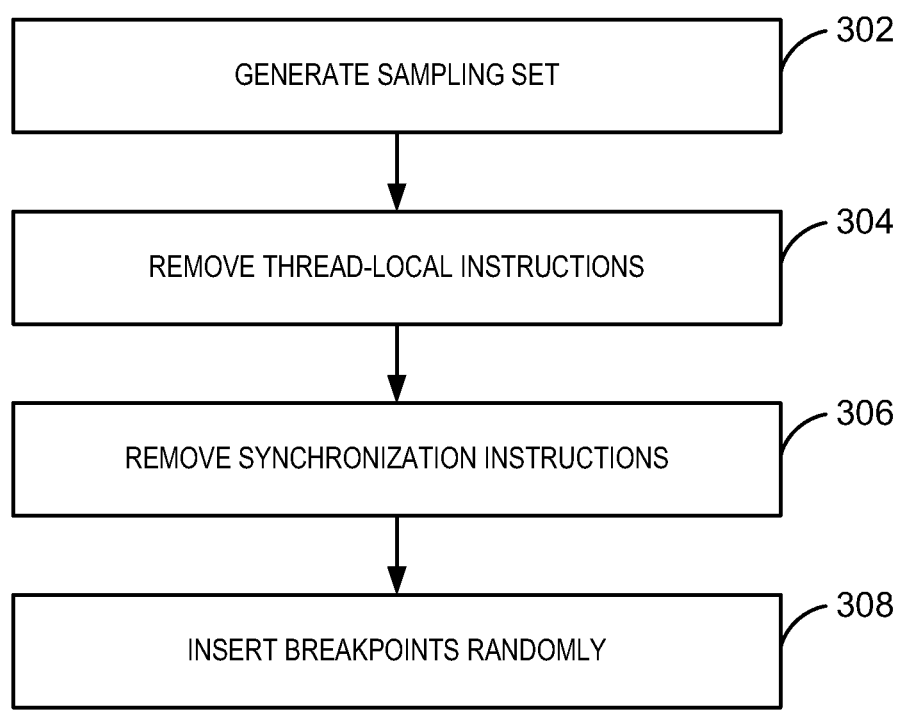
FIG. 3 is a process flow diagram of a method for inserting breakpoints in accordance with the claimed subject matter.

FIG. 3 is a process flow diagram of a method 300 for inserting breakpoints in accordance with the claimed subject matter. The method 300 may be performed by the detector 106 on a small percentage of random memory accesses. It should be understood that the process flow diagram is not intended to indicate a particular order of execution.

The method 300 begins at block 302, where the detector 106 generates a sampling set. Given a program binary, the detector 106 may disassemble the binary to generate a sampling set consisting of all program locations that access memory. In an exemplary embodiment, the debugging symbols of the program binary may be used to perform this disassembly. This feature may be relaxed by using sophisticated disassemblers, such as the IDA Pro-Disassembler and Debugger. Optionally, to separate code from data, prospective instructions may only be used once a code execution breakpoint had been triggered at that particular address.

At block 304, the detector 106 may remove thread-local instructions from the sampling set. The detector 106 may perform a simple static analysis to identify instructions that are guaranteed to only touch thread-local stack locations. Further, the detector 106 may remove these instructions from the sampling set.

Similarly, at block 306, the detector 106 may remove synchronizing instructions from the sampling set. Synchronizing instructions may be identified as instructions that access memory locations tagged as "volatile" or directly declared by compiler keywords as memory accesses that intentionally participate in data races. Additional instructions that use hardware synchronization primitives, such as interlocked, may also be removed.

Removing these synchronization instructions may prevent the detector 106 from reporting data races on synchronization variables. However, the detector 106 may still detect a data race between a synchronization access and a regular data access, if the latter is in the sampling set.

At block 308, the detector 106 may insert code breakpoints randomly into the sampling set. In an exemplary embodiment, an initial set of breakpoints may be set at a small number of program locations. The program locations may be selected uniformly randomly from the sampling set.

The initial set of breakpoints may be supplemented by a subsequent set of breakpoints inserted when the breakpoints fire. If and when a code breakpoint fires, the detector 106 may perform conflict detection for the memory access at that breakpoint. Then, the detector 106 may choose another random program location from the sampling set, and set a breakpoint at that location.

The method 300 may uniformly sample all program locations in the sampling set irrespective of the frequency with which the program executes these locations. This is because the choice of inserting a code breakpoint is performed uniformly at random for all locations in the sampling set. Over a period of time, the breakpoints will tend to reside at rarely executed program locations, increasing the likelihood that those locations are sampled the next time they execute.

In an exemplary embodiment, information may be available about program locations more likely to participate in a race. This information may be made available either through user annotations or through prior analysis. The detector 106 may prioritize those locations by biasing their selection from the sampling set.

3.1.2. Controlling the Sampling Rate

While the detector 106 may not affect the sampling distribution over program locations, the sampling rate may be tied to how frequently the program executes locations with a code breakpoint. In the worst case, if all of the breakpoints are set on dead code, the detector 106 may stop performing data-race detection altogether. To avoid such a scenario, and to better control the sampling rate, the detector 106 may periodically check the number of breakpoints fired every second. The detector 106 may then adjust the number of breakpoints set based on whether the experienced sampling rate is higher or lower than a specified threshold, i.e., a target rate.

3.2. Data Race Detection

Figure 4:
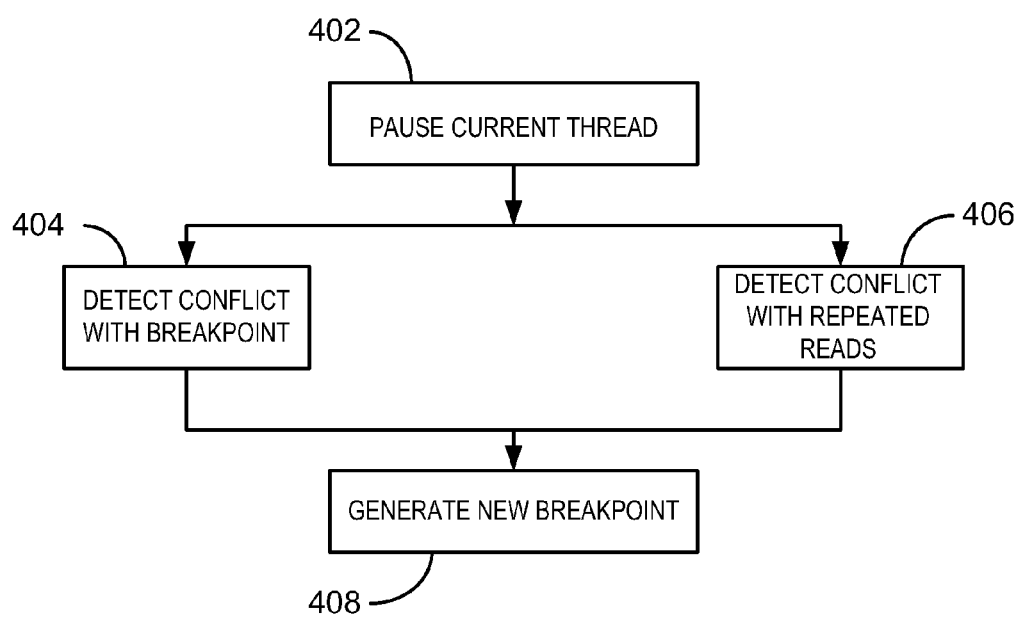
FIG. 4 is a process flow diagram of a method for detecting a data race in accordance with the claimed subject matter.

FIG. 4 is a process flow diagram of a method 400 for detecting a data race in accordance with the claimed subject matter. As stated previously, the detector 106 may pick a small percentage of memory accesses as likely candidates for data-race detection. For these sampled accesses, the detector 106 may perform the method 400.

The method 400 begins at block 402, where the data race detector may pause the current thread. The pause may be used to wait for another thread to make a conflicting access to the same memory location. Two strategies may be used simultaneously: data breakpoints and repeated-reads. At block 404, conflicts may be detected with a breakpoint. At block 406, conflicts may be detected with repeated reads. Advantageously, each strategy complements weaknesses of the other.

As stated previously, a new breakpoint may be generated after each breakpoint fires. Accordingly, at block 408, the detector 106 may insert the new breakpoint into a new program location. The new program location may be randomly selected from the sampling set using a uniform algorithm.

3.2.1. Detecting Conflicts with Data Breakpoints

Modern hardware architectures provide a facility to trap when a processor reads or writes a particular memory location. Advantageously, this feature efficiently supports data breakpoints in debuggers. In one embodiment, the x86 hardware supports four data breakpoint registers. The detector 106 may use these registers to effectively monitor for potential conflicting accesses.

If the current access is a write, the detector 106 may instruct the processor to trap on a read or write to the memory location. If the current access is a read, the detector 106 may instruct the processor to trap only on a write, as concurrent reads to the same location do not conflict. If no conflicting accesses are detected, the detector 106 may resume execution of the current thread after clearing the data breakpoint registers.

Each processor may have a separate data breakpoint register. Accordingly, the detector 106 may use an inter-processor interrupt to update the break points on all processors atomically. This may synchronize multiple threads attempting to sample different memory locations concurrently.

An x86 instruction can access variable sized memory. For 8, 16, or 32-bit accesses, the detector 106 may set a breakpoint of the appropriate size. The x86 processor may trap if another instruction accesses a memory location that overlaps with a given breakpoint. This precisely accords with the semantics for data-race detection.

For accesses that span more than 32 bits, the detector 106 may use more than one breakpoint, up to the maximum available of four. If the detector 106 runs out of breakpoint registers, the repeated-read strategy discussed below may supplement the data race detection.

When a data breakpoint fires, e.g., is trapped, the detector 106 has successfully detected a data race. Advantageously, the conflicting racing threads are caught "red handed." Because the two threads are at the point of executing conflicting accesses to the same memory location, they may be readily identified and, therefore, debugged.

It should be noted that when paging is enabled, the x86 architecture may perform the breakpoint comparisons based on the virtual address. The x86 architecture has no mechanism to modify this behavior. Two concurrent accesses to the same virtual addresses but different physical addresses do not race. In one implementation, most of the kernel resides in the same address space with two exceptions.

Kernel threads accessing the user address space cannot conflict if the threads are executing in the context of different processes. If a sampled access lies in the user address space, the detector 106 does not use breakpoints and defaults to the repeated-read strategy.

Similarly, a range of kernel-address space, called session memory, is mapped to different address spaces based on the session the process belongs to. When a sampled access lies in the session memory space, the detector 106 sets a data breakpoint, but checks if the conflicting accesses belongs to the same session before reporting the conflict to the user.

Additionally, a data breakpoint may miss conflicts if a processor uses a different virtual address mapped to the same physical address as the sampled access. Similarly, data breakpoints may not detect conflicts arising from hardware devices directly accessing memory. However, the repeated-read strategy does detect conflicts even in these scenarios.

3.2.2. Detecting Conflicts with Repeated Reads

The repeated-read strategy relies on the following insight: if a conflicting write changes the value of a memory location, the detector 106 may detect the change by repeatedly reading the memory location, checking for value changes.

The repeated-read strategy may be used to detect conflicting writes performed by hardware 104, e.g., devices and processors. The repeated-read may involve reading the memory location once before and once after the pause at block 402. A change in value is an indication of a conflicting write, and hence a data race.

One feature of this approach is that conflicting reads may not be detected. Similarly, the detector 106 may not detect multiple conflicting writes where the last write is of the same value as an initial value. However, this strategy may be very useful in practice. Advantageously, the repeated reads approach is easy to implement. In an exemplary embodiment, several kernel bugs were detected with repeated reads.

Another feature of the strategy may be that repeated-reads only identify one of the two conflicting threads. This makes debugging the conflict more challenging, as one conflicting thread cannot be readily identified to debug. However, this also makes the breakpoint strategy a good complement. As stated previously, the breakpoint strategy may identify both conflicting threads.

3.2.3. Inserting Delays

For a sampled memory access, the detector 106 attempts to detect a conflicting access to the same memory location by delaying the thread for a short amount of time. For the detector 106 to be successful, this delay may be configured to be long enough for the conflicting access to occur.

However, delaying the thread for too long may be dangerous, especially if the thread holds some resource crucial for the proper functioning of the entire system. In an exemplary embodiment fo the invention, the following delay algorithm may be used.

Depending on the IRQL (Interrupt Request Level) of the executing thread, the detector 106 may delay the thread for a pre-determined maximum amount of time. At IRQLs higher than the DISPATCH level (the level at which the kernel scheduler operates), the detector 106 may not insert any delay. In one embodiment, a small window of delay may be used at this level to identify possible data races between interrupt service routines.

Threads running at the DISPATCH level may not yield the processor to another thread. As such, the delay may simply be a busy loop. Currently, threads may be delayed at this level for a random amount of time less than 1 ms. For lower IRQLs, the detector 106 may delay the thread for a maximum of 15 ms by spinning in a loop that yields the current time quantum. During this loop, the thread may repeatedly check to see if other threads are making progress by inspecting the rate at which breakpoints fire. If progress is not detected, the waiting thread may prematurely stop its wait.

3.3. Dealing with Benign Data Races

As stated previously, data races may be logged, and then filtered for benign data races. As described below, the detector 106 may use several heuristics to filter, or prune, benign data races from this log.

Not all data races are erroneous. As such, the detector 106 may effectively prune or deprioritize benign data races when reporting data races to the user. However, inferring whether or not a data race is benign may be challenging. For instance, a data race between two concurrent non-atomic counter updates might be benign if the counter is a statistic variable whose fidelity is not important to the behavior of the program. However, if the counter is used to maintain the number of references to a shared object, then the data race could lead to a memory leak or a premature free of the object.

In one implementation, around 90% of the data-race reports are benign. By inspecting these benign data races, it was possible to identify the following patterns that can be identified through simple static and dynamic analysis.

Statistics Counters: Around half of the benign data races involved conflicting updates to counters that maintain various statistics about the program behavior. These counters are not necessarily write-only and could affect the control flow of the program. A common scenario is to use these counter values to perform periodic computation such as flushing a log buffer. Therefore, if the detector 106 logs several data races involving an increment instruction, and the value of the memory location consistently increases across these logs, then the pruning phase may tag these data races as statistics-counter races. Checking for an increase in memory values helps the pruning phase in distinguishing these statistics counters from reference counters that are usually both incremented and decremented.

Safe Flag Updates: Another class of benign races involves a thread reading a flag bit in a memory location while another thread updates a different bit in the same memory location. By analyzing few memory instructions before and after the memory access, the detector 106 may identify read-write conflicts that involve different bits. On the other hand, write-write conflicts can result in lost updates, described with respect to FIG. 1, and are not tagged as benign.

Special Variables: Some of the data races reported by the detector 106 may involve special variables in the kernel 102 where races are expected. For instance, one implementation may maintain the current time in a variable, which is read by many threads while being updated by the timer interrupt. In one implementation, the detector 106 may maintain a database of such variables, and prune races involving these variables.

While it is possible to design other patterns that identify benign data races, there may be a tradeoff between the benefit of the pruning and the risk of missing real data races. For instance, the detector 106 may treat two writes of the same value as a benign race. However, very few data-race reports matched this property. Further, as described in greater detail below, a harmful data-race may result from two such writes. There may also be instances where a benign race, despite being harmless, indicate unintended sharing in the code and may implicate a design change.

In exemplary embodiments, users may browse through the pruned, benign races to identify potential portability problems and memory-model issues in their code.

4. Evaluation

The detector 106 may satisfy two metrics for measuring the success of a data-race detection tool. First, the detector 106 may be able to find data races that programmers deem important enough to fix. Second, the detector may scale to large systems with reasonable runtime overheads.

4.1. Experimental Setup

In an exemplary implementation, the detector 106 was applied on several modules in the kernel 102. The detector 106 has been has been used on class drivers, various PnP drivers, local and remote file system drivers, storage drivers, and the core kernel executive. The kernel 102 was successfully booted with the detector 106. Further, existing kernel stress tests were run successfully with the detector 106.

4.2. Bugs Found

In the exemplary implementation, data races were reported as described in TABLE 1:

TABLE 1

| Data Races Reported | Count |
| --- | --- |
| Fixed | 12 |
| Confirmed and Being Fixed | 13 |
| Under Investigation | 8 |
| Harmless | 5 |
| Total | 38 |

A total 38 data-race reports were reported to the developers. This figure does not reflect the number of benign data races pruned heuristically and manually.

Of these 38 reports, 25 have been confirmed as bugs, 12 of which were debugged. The developers indicated that 5 of these data races were harmless. For instance, one of the benign data races results in a driver issuing an idempotent request to the device. While this could result in a performance loss, the expected frequency of the data race did not justify the cost of adding synchronization in the common case. Identifying such benign races may be facilitated by an intimate knowledge of the code that the programmers possess.

As the detector 106 delays the racing access that temporally occurs first, it is likely to explore both outcomes of the race. Despite this, only one of the 38 data races crashed the kernel 102 in the exemplary implementation. This indicates that the effects of an erroneous data race are not immediately apparent for the particular input or the hardware configuration of the current run.

4.2.1. A Boot Hang Caused by a Data Race

A hardware vendor was consistently seeing a kernel hang at boot-up time. This was not reproducible in any of the in-house machine configurations, till the vendor actually shipped the hardware to the developers. After inspecting the hang, a developer noticed a memory corruption in a driver that could be a result of a race condition. When analyzing the driver in question, the detector 106 found the data race in an hour of testing on a regular in-house machine (in which the kernel 102 did not hang). Once the source of the corruption was found (performing a status update non-atomically), the bug was immediately fixed.

4.2.2. A Not-so-Benign Data Race

The following code segment shows an erroneous data race:

```
void AddToCache( ) {
    // ...
    A: x &= ~(FLAG_NOT_DELETED);
    B: x |= FLAG_CACHED;
    MemoryBarrier( );
    // ...
}
AddToCache( );
assert( x & FLAG_CACHED );
CODE SEGMENT 5
```

In CODE SEGMENT 5, the function, AddToCache, performs two non-atomic updates to the flag variable. The detector 106 produced an error report with two threads simultaneously updating the flag at location B. Usually, two instructions writing the same values is a good hint that the data race is benign. However, the presence of the memory barrier indicated a potential error. The developer of CODE SEGMENT 5 was aware of consequences of concurrency, and the rest of the code relied on crucial invariants on the flag updates. When this data race was reported to the developer, the developer initially tagged it as benign. On further analysis, it was discovered that the code relied on the invariant that the CACHED bit is set after a call to AddToCache. The data race can break this invariant when a concurrent thread overwrites CACHED bit when performing the update at A, but gets preempted before setting the bit at B.

4.2.3. How Fixed

While data races can be hard to find and result in mysterious crashes, most may be relatively easy to fix. Of the 12 bugs, 3 were the result of missing locks. The developer could easily identify the locking discipline, and could decide which lock to add without the fear of a deadlock. Six data races were fixed by using atomic instructions, such as interlocked increment, to make a read-modify-write to a shared variable. Two bugs were a result of unintended sharing and were fixed by making the particular variable thread local. Another bug indicated a broken design due to a recent refactoring and resulted in a design change.

4.3. Runtime Overhead

Users have an inherent aversion to dynamic analysis tools that add prohibitive runtime overheads. The obvious reason is the associated waste of test resources—a slowdown of ten means that only one-tenth the amount of testing can be done with a given amount of resources. Further, runtime overheads introduced by a tool can affect the real-time execution of the program. The kernel 102 may start a recovery action if a device interrupt takes too long to finish. Alternatively, a test harness may incorrectly tag a kernel-build faulty if the kernel 102 takes too long to boot.

To measure the runtime overhead of the detector 106, the time taken for the boot-shutdown sequence was repeated measured for different sampling rates and compared against a baseline kernel 102 running without the detector 106. This implementation was done on an x86 version of the kernel 102 running on a virtual machine with 2 processors and 512 MB memory. The host machine is 2.4 GHz machine with 4 GB memory running a server operating system. The guest machine was limited to 50% of the processing resources of the host. This was done to prevent any background activity on the host from perturbing the performance of the guest.

Figure 5:
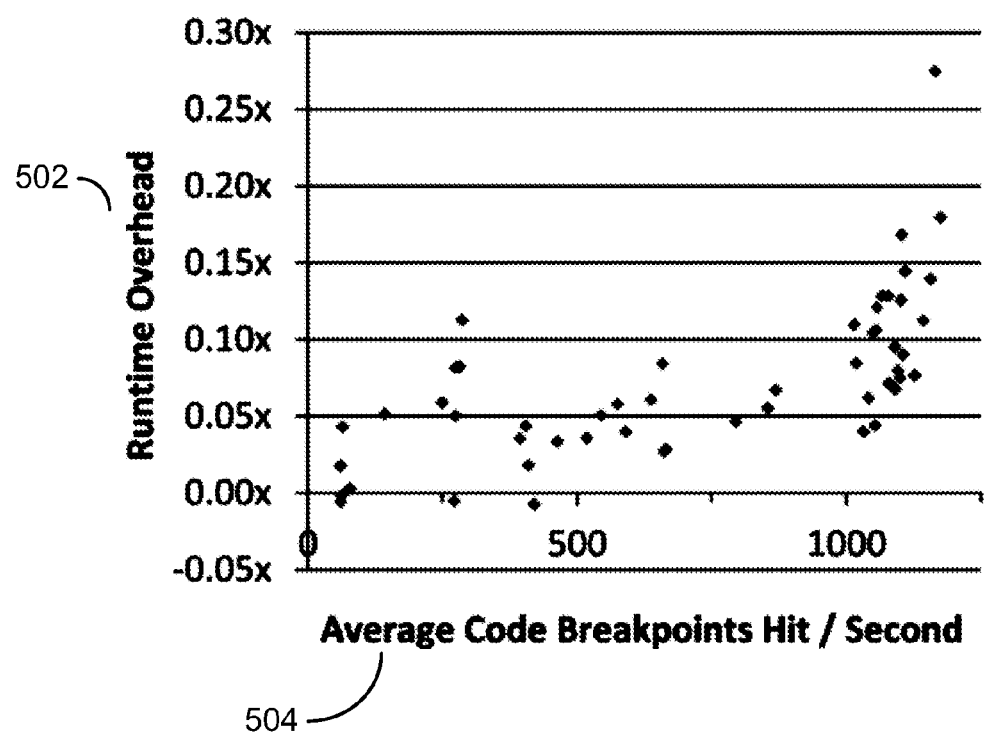
FIG. 5 is a graph that is useful in explaining data race detection in accordance with the subject innovation.

FIG. 5 is a graph 500 that is useful in explaining data race detection in accordance with the subject innovation. The graph 500 includes a y-axis for runtime overhead 502, and an x-axis for average code breakpoints hit per second 504. The graph 500 shows the runtime overhead of the detector 106 for different sampling rates, measured by the average number of code breakpoints fired per second during the run. As shown, the overhead increases roughly linearly with the sampling rate. Further, as the sampling rate tends to zero, the detector 106's overhead reaches zero. This may indicate that the detector 106 can be "always on" in various testing and deployment scenarios, allowing the user to tune the overhead to any acceptable limit.

Figure 6:
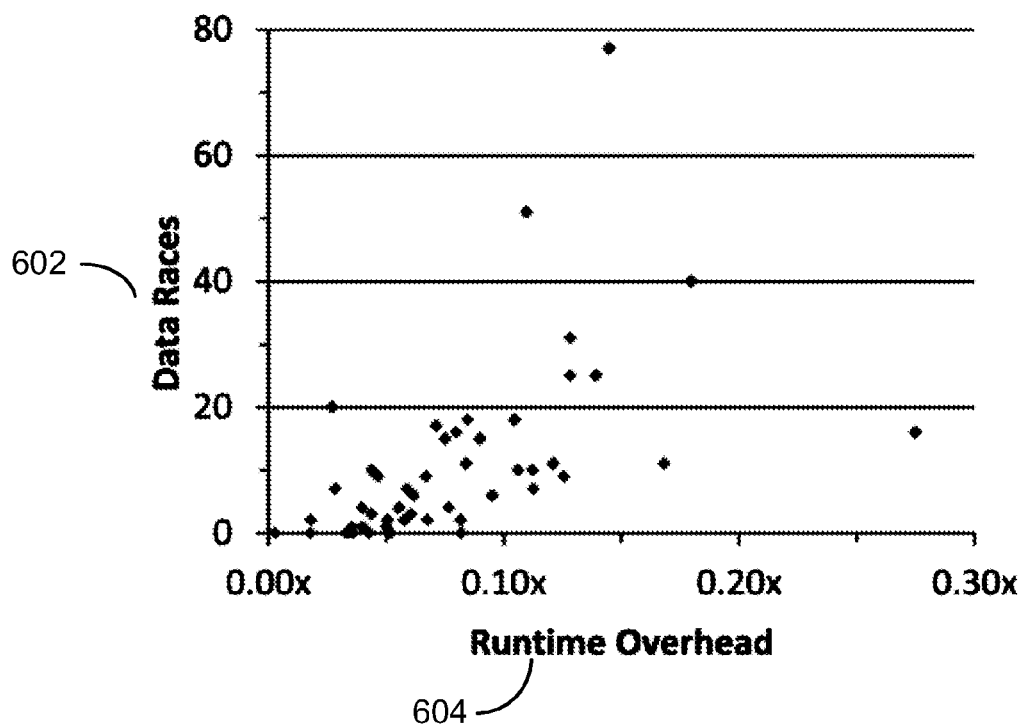
FIG. 6 is a graph that is useful in explaining data race detection in accordance with the subject innovation.

FIG. 6 is a graph 600 that is useful in explaining data race detection in accordance with the subject innovation. The graph 600 includes a y-axis for data races 602, and an x-axis for runtime overhead 604. The graph 600 shows the number of data races detected for different runtime costs. As shown, the detector 106 may be able to detect data races even for overheads less than 5%, indicating a utility at low overheads.

4.4. Benign Data Races

In another implementation, the efficacy of a pruning algorithm was measured for benign data races. The results are shown in TABLE 2. In the implementation, the detector 106 was enabled while running kernel stress tests for 2 hours sampling at approximately 1000 code breakpoints per second. The detector 106 found a total of 113 unique data races.

The benign data race patterns described above identified 86 (76%) of these as benign races. Of the remaining races, eighteen were manually identified as non-erroneous. Eight of them involved the double-checked locking idiom, where a thread performs a racy read of a flag without holding a lock, but reconfirms the value after acquiring the lock.

Another eight were accesses to volatile variables that the detector's analysis was unable to infer the type. These reports can be avoided with a more sophisticated analysis for determining the program types. TABLE 2 demonstrates that a significant percentage of benign data races may be heuristically pruned without risks of missing real data races. During this process, nine potentially harmful data races were found, of which five were confirmed bugs.

Figure 7:
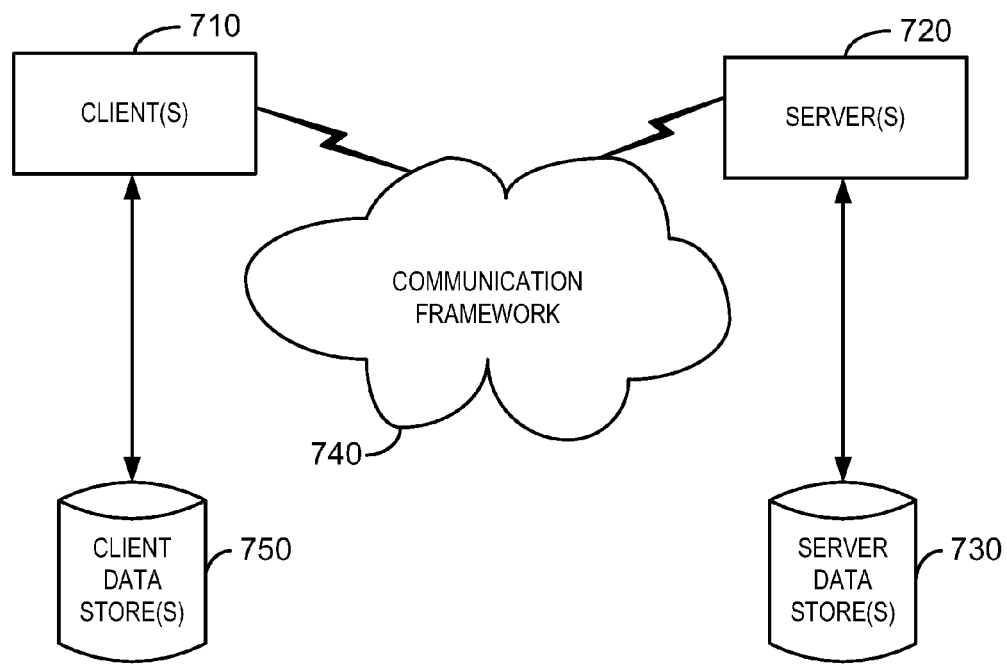
FIG. 7 is a block diagram of an exemplary networking environment wherein aspects of the claimed subject matter can be employed.

FIG. 7 is a block diagram of an exemplary networking environment 700 wherein aspects of the claimed subject matter can be employed. Moreover, the exemplary networking environment 700 may be used to implement a system and method of detecting data races.

The networking environment 700 includes one or more client(s) 710. The client(s) 710 can be hardware and/or software (e.g., threads, processes, computing devices). As an example, the client(s) 710 may be computers providing access to servers over a communication framework 740, such as the Internet.

The system 700 also includes one or more server(s) 720. The server(s) 720 can be hardware and/or software (e.g., threads, processes, computing devices). The server(s) 720 may include network storage systems. The server(s) may be accessed by the client(s) 710.

One possible communication between a client 710 and a server 720 can be in the form of a data packet adapted to be transmitted between two or more computer processes. The system 700 includes a communication framework 740 that can be employed to facilitate communications between the client(s) 710 and the server(s) 720.

The client(s) 710 are operably connected to one or more client data store(s) 750 that can be employed to store information local to the client(s) 710. The client data store(s) 750 may be located in the client(s) 710, or remotely, such as in a cloud server. Similarly, the server(s) 720 are operably connected to one or more server data store(s) 730 that can be employed to store information local to the servers 720.

Figure 8:
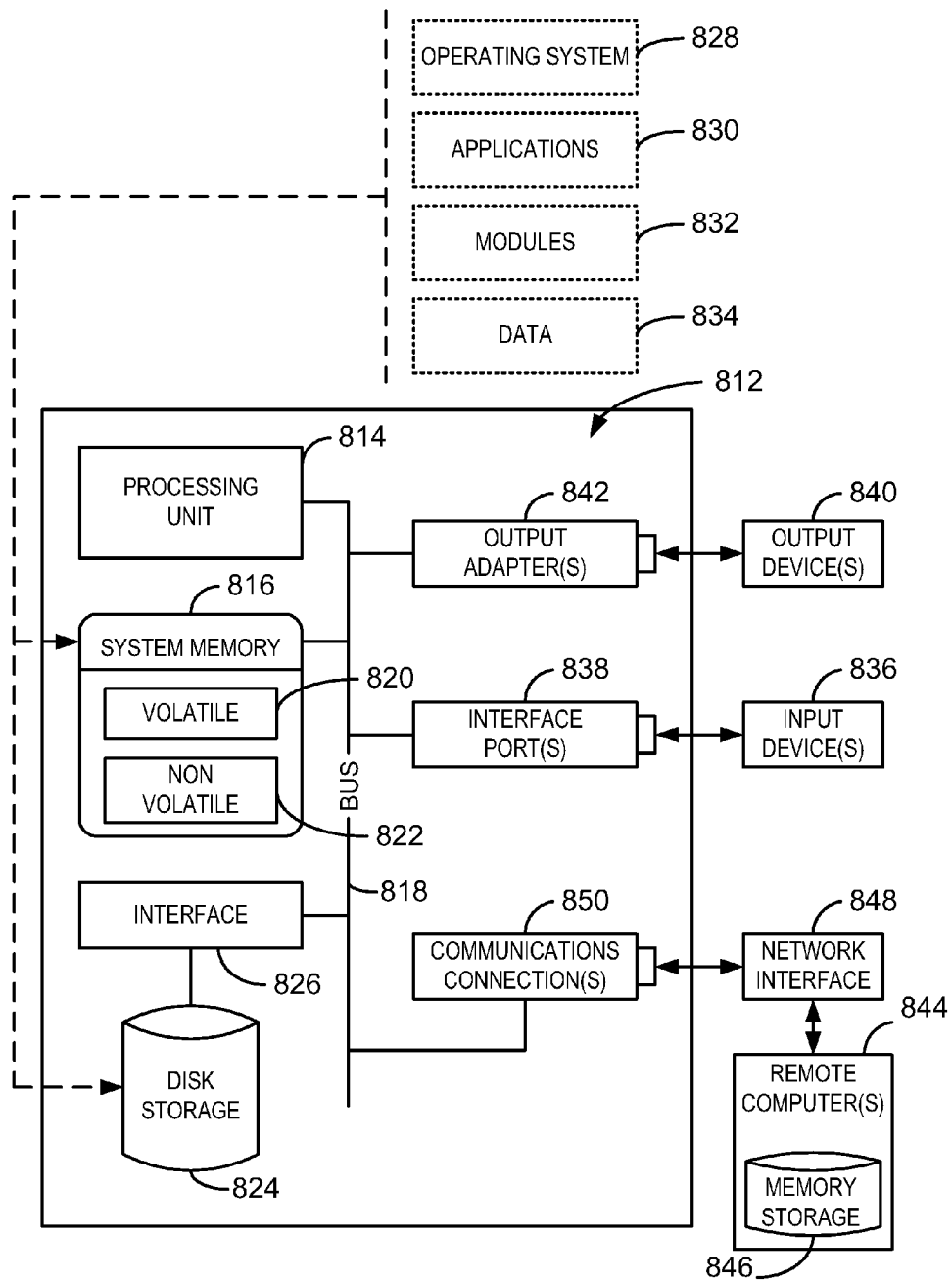
FIG. 8 is a block diagram of an exemplary operating environment for implementing various aspects of the claimed subject matter.

With reference to FIG. 8, an exemplary operating environment 800 is shown for implementing various aspects of the claimed subject matter. The exemplary operating environment 800 includes a computer 812. The computer 812 includes a processing unit 814, a system memory 816, and a system bus 818.

The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures known to those of ordinary skill in the art. The system memory 816 comprises non-transitory computer-readable storage media that includes volatile memory 820 and nonvolatile memory 822.

The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), or flash memory.

Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 812 also includes other non-transitory computer-readable media, such as removable/non-removable, volatile/non-volatile computer storage media. FIG. 8 shows, for example a disk storage 824. Disk storage 824 includes, but is not limited to, devices like a magnetic disk drive, floppy disk drive, tape drive, Jaz drive, Zip drive, LS-100 drive, flash memory card, or memory stick.

In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in the suitable operating environment 800. Such software includes an operating system 828. Operating system 828, which can be stored on disk storage 824, acts to control and allocate resources of the computer system 812.

System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 836 connect to the processing unit 814 through the system bus 818 via interface port(s) 838. Interface port(s) 838 include, for example, a serial port, a parallel port, a game port, and a universal serial bus (USB).

Output device(s) 840 use some of the same type of ports as input device(s) 836. Thus, for example, a USB port may be used to provide input to the computer 812, and to output information from computer 812 to an output device 840.

Output adapter 842 is provided to illustrate that there are some output devices 840 like monitors, speakers, and printers, among other output devices 840, which are accessible via adapters. The output adapters 842 include, by way of illustration and not limitation, video and sound cards that provide a means of connection between the output device 840 and the system bus 818. It can be noted that other devices and/or systems of devices provide both input and output capabilities such as remote computer(s) 844.

The computer 812 can be a server hosting various software applications in a networked environment using logical connections to one or more remote computers, such as remote computer(s) 844. The remote computer(s) 844 may be client systems configured with web browsers, PC applications, mobile phone applications, and the like.

The remote computer(s) 844 can be a personal computer, a server, a router, a network PC, a workstation, a microprocessor based appliance, a mobile phone, a peer device or other common network node and the like, and typically includes many or all of the elements described relative to the computer 812.

For purposes of brevity, only a memory storage device 846 is illustrated with remote computer(s) 844. Remote computer(s) 844 is logically connected to the computer 812 through a network interface 848 and then physically connected via a communication connection 850.

Network interface 848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to the computer 812. The hardware/software for connection to the network interface 848 may include, for exemplary purposes only, internal and external technologies such as, mobile phone switches, modems including regular telephone grade modems, cable modems and DSL modems, ISDN adapters, and Ethernet cards.

An exemplary processing unit 814 for the server may be a computing cluster comprising Intel® Xeon CPUs. The disk storage 824 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A processor-implemented method for detecting a data race, comprising:
   inserting a plurality of breakpoints into a corresponding plurality of randomly selected program locations of a kernel mode program, wherein the program locations comprise instructions that access a plurality of memory locations;
   pausing a thread at one of the breakpoints;
   detecting one or more data races for the memory locations in response to one or more of the breakpoints firing by detecting a data race for a memory location accessed by instructions at one of the breakpoints, wherein the data race for the memory location is detected by trapping on a memory access to the memory location corresponding to the one of the breakpoints;
   detecting a data race by using a repeated read comprising reading the memory location before and after the pause to determine if another thread modified the memory location, the repeated read detection carried out simultaneously with a detection of the data race with the second thread using the breakpoint; and
   generating a report describing the one or more data races.

2. The processor-implemented method recited in claim 1, wherein the data race is indirectly detected by repeated read of a same value at the memory location.

3. The processor-implemented method recited in claim 2, wherein the repeated read comprises:
   reading the memory location corresponding to the one of the breakpoints before pausing the thread;
   reading the memory location corresponding to the one of the breakpoints after pausing the thread; and
   determining that a value of the memory location after the pause is different than a value of the memory location before the pause.

4. The processor-implemented method recited in claim 1, wherein the memory access by the thread is a write, and a type of trapping on the memory access is for a read or write to the memory location corresponding to the one of the breakpoints.

5. The processor-implemented method recited in claim 1, wherein the memory access by the thread is a read, and a type of trapping on the memory access is for a write to the memory location corresponding to the one of the breakpoints.

6. The processor-implemented method recited in claim 1, wherein the thread is executed in kernel mode.

7. The processor-implemented method recited in claim 6, wherein pausing the thread comprises delaying the thread a predetermined amount of time, wherein an interrupt request level of the thread is at a DISPATCH level or lower.

8. The processor-implemented method recited in claim 1, wherein inserting the plurality of breakpoints comprises:
   generating a sampling set comprising the plurality of program locations, wherein the plurality of program locations comprise a corresponding plurality of instructions that access memory;
   removing from the sampling set, one or more program locations comprising a thread-local instruction;
   removing from the sampling set, one or more program locations comprising a synchronization instruction;
   selecting from the sampling set, one or more of the program locations randomly, and uniformly; and
   generating one or more corresponding breakpoints at the one or more selected program locations.

9. The processor-implemented method recited in claim 8, comprising:
   selecting from the sampling set, one of the program locations randomly, and uniformly; and
   generating a breakpoint at the selected one of the program locations.

10. A system for detecting data races, comprising:
a processing unit; and
a system memory, wherein the system memory comprises code configured to direct the processing unit to:
  pause a first thread of user mode execution;
  detect a data race with a second thread for a memory location, wherein the data race with the second thread is detected by trapping a memory access by the second thread to the memory location using a breakpoint, and wherein the second thread comprises kernel mode execution; and
  detect a data race by using a repeated read, simultaneously with a detection of the data race with the second thread using the breakpoint.

11. The system recited in claim 10, wherein the code is configured to direct the processing unit to:
  insert a plurality of breakpoints into a corresponding plurality of program locations, wherein each of the program locations comprise an instruction accessing a corresponding plurality of memory locations, and wherein each of the program locations is selected randomly, and wherein in response to a firing of one of the breakpoints, the processing unit performs:
    the pause of the first thread;
    the detection of the data race with the second thread; and
    the detection of the data race using the repeated read; and
    generate a report describing one or more data races comprising:
      the data race with the second thread; and
      the data race inferred using the repeated read.

12. The system recited in claim 11, wherein the code configured to direct the processing unit to insert the plurality of breakpoints comprises code configured to direct the processing unit to:
  generate a sampling set comprising the plurality of program locations, wherein the plurality of program locations comprise a corresponding plurality of instructions that access memory;
  remove from the sampling set, one or more program locations comprising a thread-local instruction;
  remove from the sampling set, one or more program locations comprising a synchronization instruction;
  select from the sampling set, one or more of the program locations randomly, and uniformly; and
  generate one or more corresponding breakpoints at the one or more selected program locations.

13. The system recited in claim 10, wherein a type of the trapping is based on a memory access by the first thread.

14. The system recited in claim 13, wherein the memory access by the thread is a write, and the type of the trapping is for a read or write to the memory location corresponding to the one of the breakpoints.

15. The system recited in claim 13, wherein the memory access by the thread is a read, and the type of the trapping is for a write to the memory location corresponding to the one of the breakpoints.

16. The system recited in claim 10, wherein the repeated read comprises code configured to direct the processing unit to:
  read the memory location before pausing the thread;
  reading the memory location after pausing the thread; and
  determine that a value of the memory location after the pause is different than a value of the memory location before the pause.

17. The system recited in claim 10, wherein the first thread is executed in kernel mode.

18. One or more computer-readable storage memories, comprising code configured to direct a processing unit to:
  generate a sampling set of kernel code instructions that perform memory accesses;
  remove thread-local instructions from the sampling set;
  remove synchronization instructions from the sampling set;
  insert a plurality of breakpoints into a corresponding plurality of program locations associated with the sampling set, wherein each of the program locations access a plurality of memory locations, and wherein each of the program locations is selected randomly;
  detect one or more data races for the memory locations in response to one or more of the breakpoints firing, wherein the code configured to detect the one or more data races comprises code configured to direct the processing unit to:
    pause a thread comprising one of the breakpoints;
    detect a data race for a memory location corresponding to the one of the breakpoints, wherein the data race for the memory location is detected by trapping on a memory access to the memory location corresponding to the one of the breakpoints;
    detect a data race by using a repeated read, simultaneously with a detection of the data race with the second thread using the breakpoint; and
    generate a report describing the one or more data races.

19. The computer-readable storage memories recited in claim 18, comprising code configured to direct a processing unit to:
  prune one or more benign races from the one or more data races; and
  generate a report describing the one or more data races.

* * * * *